(12) United States Patent
Liao

(10) Patent No.: US 9,547,155 B2
(45) Date of Patent: Jan. 17, 2017

(54) SEVEN-PIECE OPTICAL LENS FOR CAPTURING IMAGE AND SEVEN-PIECE OPTICAL MODULES FOR CAPTURING IMAGE

(71) Applicant: ABILITY OPTO-ELECTRONICS TECHNOLOGY CO.LTD., Taichung County (TW)

(72) Inventor: Kuo-Yu Liao, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 254 days.

(21) Appl. No.: 14/461,756

(22) Filed: Aug. 18, 2014

(65) Prior Publication Data

US 2015/0185441 A1 Jul. 2, 2015

(30) Foreign Application Priority Data

Dec. 27, 2013 (TW) .............................. 102148594 A

(51) Int. Cl.
*G02B 9/64* (2006.01)
*G02B 13/00* (2006.01)

(52) U.S. Cl.
CPC ............. *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 6,259,508 B1 * 7/2001 Shigematsu .......... G03F 7/2002
355/53

FOREIGN PATENT DOCUMENTS

| CN | 203275749 U | | 11/2013 | |
| JP | 2010-085484 | * | 4/2010 | ............. G02B 13/00 |
| TW | 201028724 A | | 8/2010 | |

* cited by examiner

*Primary Examiner* — Joseph P Martinez
(74) *Attorney, Agent, or Firm* — Muncy, Geissler, Olds & Lowe, P.C.

(57) ABSTRACT

The invention discloses a seven-piece optical lens for capturing image and a seven-piece optical module for capturing image. In order from an object side to an image side, the optical lens along the optical axis comprises a first lens element; a second lens element; a third lens element; a fourth lens element with positive refractive power; a fifth lens element; a sixth lens element with positive refractive power having a convex image-side; and a seventh lens element with positive refractive power having a convex object-side, and the first lens element, the second lens element, the third lens element, and the fifth lens element have refractive power, and at least one of the image-side surface and object-side surface of the second lens element, the sixth lens element, and the seventh lens element are aspheric.

11 Claims, 12 Drawing Sheets

US 9,547,155 B2

SEVEN-PIECE OPTICAL LENS FOR CAPTURING IMAGE AND SEVEN-PIECE OPTICAL MODULES FOR CAPTURING IMAGE

CROSS-REFERENCE TO RELATED APPLICATION

This application claims priority from Taiwan Patent Application No. 102148594, filed on Dec. 27, 2013, in the Taiwan Intellectual Property Office, the content of which are hereby incorporated by reference in their entirety for all purposes.

BACKGROUND OF THE INVENTION

1. Field of the Invention

The following description relates to a seven-piece optical lens for capturing image and seven-piece optical modules for capturing image, and more particularly to the optical lens for capturing image assembly comprised of a seven-piece optical lens for capturing image and optical modules for capturing image thereof and be applied to 3C electronic products.

2. Description of the Related Art

Presently, optical lenses for capturing image are usually disposed in the digital gadgets, such as cell phones, game consoles, PC CAM, DSC, or DVD and so on, for capturing image of an object, and the optical lens for capturing image tends to be developed with a compact design and a low cost, while meeting the user requirements of good aberration correction ability, high resolution, and high image quality.

As the conventional spherical polishing glass lenses, which are of more choices, and the glass lenses are advantageous to field curvature correction have been widely-used in the field. However, when smaller F Number and larger Wide-angle are applied to the spherical polishing glass lenses, it becomes harder to correct the field curvature, such as the longitudinal spherical aberration. In order to improve the shortcomings of the aforementioned traditional spherical polishing glass lenses, the current image capturing devices have used aspheric plastic lens or aspheric molding glass lens to acquire better imaging quality; nonetheless, structure of the preceding optical module for capturing image normally needs combination of more lenses so as to have better optical characteristic which results that the whole optical module for capturing image is oversized; consequently, the module is incapable of downsizing and having lower cost, for failing to meet the demand of miniaturization of electronic products.

As a result, how to reduce the total length of optical lens for capturing image and effectively combine sets of lenses so as to further improve the imaging quality become an extremely crucial issue.

SUMMARY OF THE INVENTION

The aspect of embodiment of the present invention aims to an optical lens for capturing image and optical modules for capturing image which use combination of refractive power, convex and concave surfaces of seven-piece optical lenses to further shorten total length of optical lens for capturing image so as to increase imaging quality and be applied to minimized electronic products.

According to the aforementioned purpose, the present invention provides a seven-piece optical lens for capturing image, in order from an object side to an image side, the optical lens along an optical axis which may comprise: a first lens element with refractive power near the optical axis; a second lens element with refractive power near the optical axis, wherein at least one of an object-side surface and an image-side surface of the second lens element are aspheric; a third lens element with refractive power near the optical axis; a fourth lens element with positive refractive power near the optical axis; a fifth lens element with refractive power near the optical axis; a sixth lens element with positive refractive power near the optical axis and having a convex image-side surface, wherein at least one of an object-side surface and the image-side surface of the sixth lens element may be aspheric; and a seventh lens element with positive refractive power near the optical axis and having a convex object-side surface, wherein at least one of an image-side surface and the object-side surface of the seventh lens element may be aspheric.

Preferably, f may be a focal length of the seven-piece optical lens for capturing image, FL may be a distance from an object-side surface of the first lens element to the image-side surface of the seventh lens element along the optical axis, and the following relation may be satisfied: $1.0 < FL/f < 8.0$.

Preferably, FL is a distance from an object-side surface of the first lens element to the image-side surface of the seventh lens element along the optical axis, ct3 is a central thickness of the third lens element, and the following relation is satisfied: $3.0 < FL/ct3 < 13.0$.

Preferably, Dg is a diagonal length of an image-plane for the max image-forming perspective view of the seven-piece optical lens for capturing image, ct3 is a central thickness of the third lens element, and the following relation is satisfied: $0.8 < Dg/ct3 < 8.0$.

Preferably, f is a focal length of the seven-piece optical lens for capturing image, R2 is a curvature radius of the image-side surface of the first lens element near the optical axis.

Preferably, the first, the second, the third, the fourth, the fifth, the sixth or the seventh lens elements may comprise plastic material.

In accordance with the preceding purpose, the present invention further provides a seven-piece optical module for capturing image which may comprise: a seven-piece optical lens for capturing image, in order from an object side to an image side, the optical lens along an optical axis comprising: a first lens element with refractive power near the optical axis; a second lens element with refractive power near the optical axis, wherein at least one of an object-side surface and an image-side surface of the second lens element are aspheric; a third lens element with refractive power near the optical axis; a fourth lens element with positive refractive power near the optical axis; a fifth lens element with refractive power near the optical axis; a sixth lens element with positive refractive power near the optical axis and having a convex image-side surface, wherein at least one of an object-side surface and the image-side surface of the sixth lens element may be aspheric; and a seventh lens element with positive refractive power near the optical axis and having a convex object-side surface, wherein at least one of an image-side surface and the object-side surface of the seventh lens element may be aspheric; an image sensing device, disposed on an image-plane for image formation for an object; and an aperture stop disposed between the object and the fourth lens element.

Preferably, f may be a focal length of the seven-piece optical lens for capturing image, FL may be a distance from an object-side surface of the first lens element to the image-side surface of the seventh lens element along the optical axis, and the following relation may be satisfied: 1.0<FL/f<8.0.

Preferably, Dg may be a diagonal length of the image plane for a max image-forming perspective view of the seven-piece optical lens for capturing image, FL may be a distance from the object-side surface of the first lens element to the image-side surface of the seventh lens element along the optical axis, and the following relation may be satisfied: 3.0<FL/Dg<20.0.

Preferably, an IR-CUT filter adjusting passing wavelength section of light of the image may further be comprised.

Preferably, the IR-CUT filter may comprise a plate glass material.

Preferably, the seven-piece optical module for capturing image may imagine the object on the image sensing device by combination of the first, the second, the third, the fourth, the fifth, the sixth and the seventh lens elements, the aperture stop, the IR-CUT filter and a protective lens.

Preferably, the first, the second, the third, the fourth, the fifth, the sixth or the seventh lens elements may comprise a plastic material.

BRIEF DESCRIPTION OF THE DRAWINGS

Hereinafter, embodiments of the present invention will be described in detail with reference to the accompanying drawings so that those skilled in the art to which the present invention pertains can realize the present invention, wherein.

DETAILED DESCRIPTION OF THE PREFERRED EMBODIMENTS

As used herein, the term "and/or" includes any and all combinations of one or more of the associated listed items. Expressions such as "at least one of," when preceding a list of elements, modify the entire list of elements and do not modify the individual elements of the list.

Figure 1A:
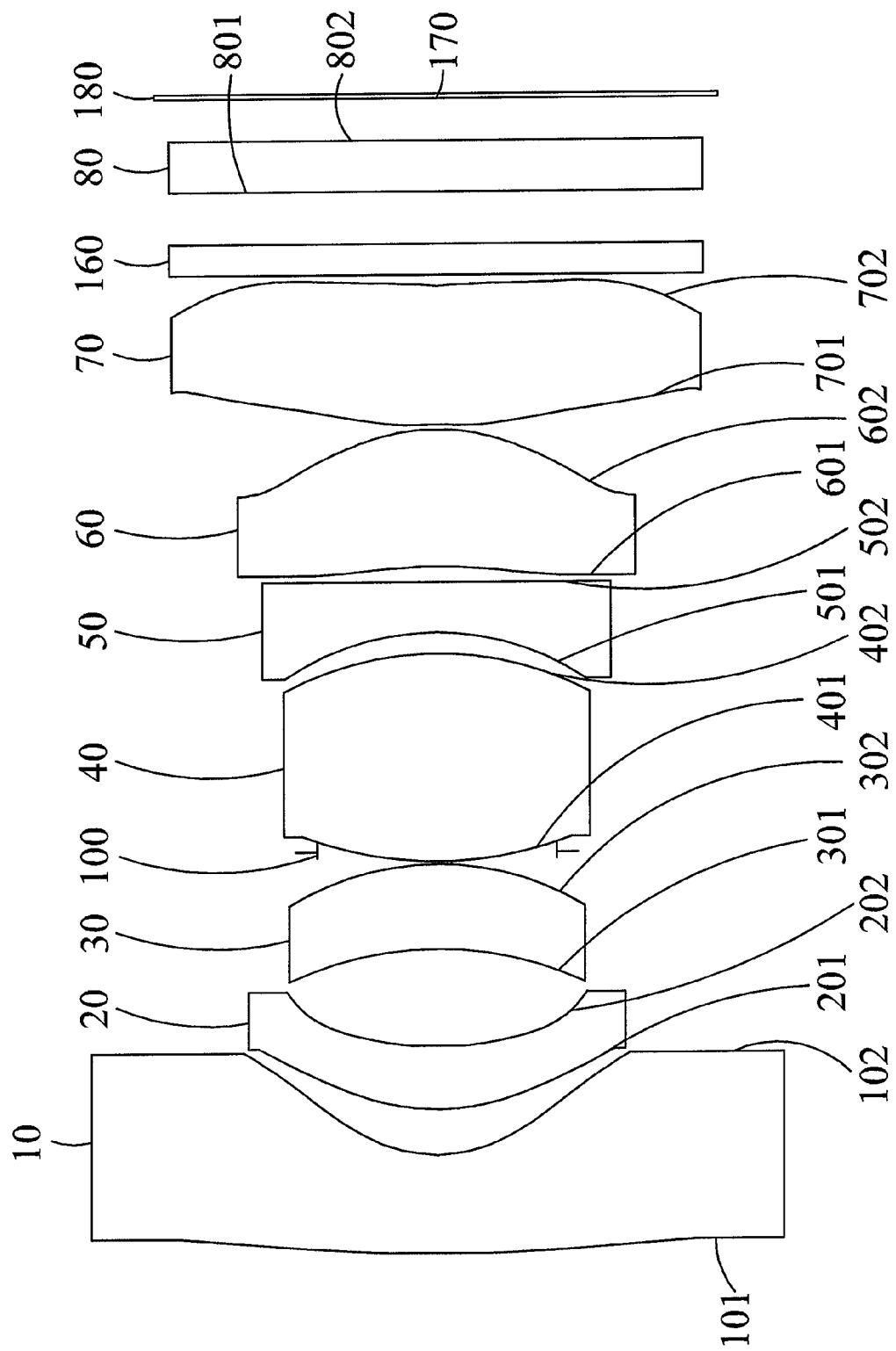
FIG. 1A is a schematic view of the first embodiment of a seven-piece optical module for capturing image according to the present invention.

Please refer to FIG. 1A which is a schematic view of the first embodiment of a seven-piece optical module for capturing image according to the present invention. As FIG. 1A shows, the present invention provides a seven-piece optical lens for capturing image, in order from an object side to an image side, the optical lens along an optical axis which comprises: a first lens element 10, a second lens element 20, a third lens element 30, a fourth lens element 40, a fifth lens element 50, a sixth lens element 60, and a seventh lens element 70. Wherein, the first lens element 10 with refractive power; the second lens element 20 with refractive power, wherein at least one of an object-side surface 201 and an image-side surface 202 of the second lens element are aspheric; the third lens element 30 with refractive power; the fourth lens element 40 with positive refractive power; the fifth lens element 50 with refractive power; the sixth lens element 60 with positive refractive power and having a convex image-side surface 602, wherein at least one of an object-side surface 601 and the image-side surface 602 of the sixth lens element are aspheric; and the seventh lens element 70 with positive refractive power and having a convex object-side surface 701, wherein at least one of the image-side surface 702 and an object-side surface 701 of the seventh lens element are aspheric.

The seven-piece optical module for capturing image of the present invention further comprises an aperture stop 100 and an IR-CUT filter 160; the aperture stop 100 is disposed between an object and the fourth lens element 40, the IR-CUT filter 160 is disposed between the seventh lens element 70 and a protective lens 80, and the protective lens 80 is disposed in front of an image-plane 170. The IR-CUT filter 160 is normally made of plate optical material and does not affect focal length of the seven-piece optical module for capturing image of the present invention.

The seven-piece optical module for capturing image further comprises an image sensing device 180 which is disposed on the image-plane 170 and imagines an object to be imagined. The first 10, the second 20, the third 30, the fourth 40, the fifth 50, the sixth 60. or the seventh 70 lens elements comprise plastic or glass material, and the Aspherical formula is:

$$z = ch^2/[1+[1-(k+1)c^2h^2]^{0.5}] + Ah^2 + Bh^4 + Ch^6 + Dh^8 + Eh^{10} + Fh^{12} + Gh^{14} + Hh^{16} + \ldots, \quad (1)$$

wherein, z is a position value of the position along the optical axis and at the height h which reference to the surface apex; k is the conic coefficient, c is the reciprocal of curvature radius and A, B, C, D, E, F, G and H are high level aspheric coefficients.

The optical data of the first embodiment is shown as Table 1, wherein the object-side surfaces and the image-side surfaces of the first 10 to the seventh 70 lens elements all use the formula (1) which is consisted of the Aspherical formula, and the aspheric coefficients are shown as Table 2, wherein a focal length f of the seven-piece optical lens for capturing image is 2.00 mm, a distance FL from the object-side surface of the first lens element to the image-side surface of the seventh lens element is 9.263 mm, Dg, which is a diagonal length of the image-plane for the max image-forming perspective view of the seven-piece optical lens for capturing image, is 5.250 mm, a central thickness of the third lens element ct3 is 0.81 mm, a curvature radius of the image-side surface of the first lens element near the optical axis R2 is 1.15 mm, FL/ct3=11.44, Dg/ct3=6.48, f/R2=1.74, FL/Dg=1.764, FL/f=4.632.

TABLE 1

The optical data of the first embodiment
The optical data of the first embodiment

|  | Surface# | Curvature Radius | Thickness | Index (Nd) | Abbe# (Vd) |
|---|---|---|---|---|---|
| The first lens element | Surface #1 | 6.7 | 0.94 | 1.53 | 55.8 |
|  | Surface #2 | 1.15 | 0.44 |  |  |
| The second lens element | Surface #3 | 2.4 | 0.58 | 1.61 | 25.5 |
|  | Surface #4 | 2.9 | 0.94 |  |  |
| The third lens element | Surface #5 | −3.12 | 0.81 | 1.61 | 25.5 |
|  | Surface #6 | −2.68 | 0.12 |  |  |
| Aperture stop |  | ∞ | −0.09 |  |  |
| The fourth lens element | Surface #7 | 3.54 | 1.98 | 1.83 | 42.7 |
|  | Surface #8 | −3.20 | 0.21 |  |  |
| The fifth lens element | Surface #9 | −2.57 | 0.49 | 1.95 | 17.4 |
|  | Surface #10 | −117.5 | 0.11 |  |  |
| The sixth lens element | Surface #11 | −10.2 | 1.31 | 1.53 | 55.7 |
|  | Surface #12 | −2.23 | 0.04 |  |  |
| The seventh lens element | Surface #13 | 3.63 | 1.34 |  |  |
|  | Surface #14 | −8.5 | 0.08 | 1.53 | 55.8 |
| IR-CUT filter | Surface #15 | ∞ | 0.3 | 1.51 | 64.1 |
|  | Surface #16 | ∞ | 0.49 |  |  |
| Protective lens | Surface #17 | ∞ | 0.5 | 1.51 | 64.1 |
|  | Surface #18 | ∞ | 0.42 |  |  |

Figure 1B:
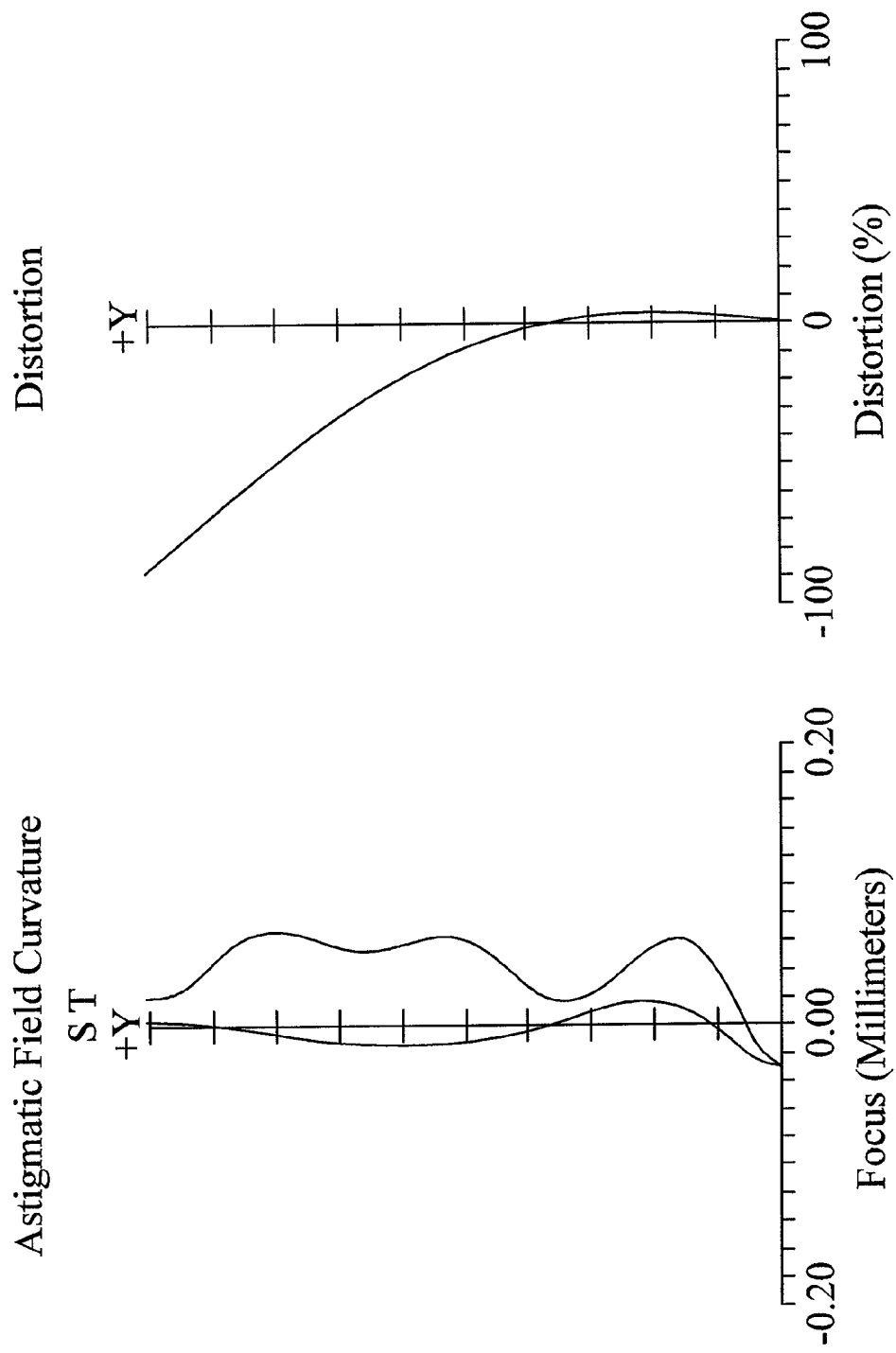
FIG. 1B is astigmatic field curves and a distortion curve of the first embodiment according to the present invention.
Figure 1C:
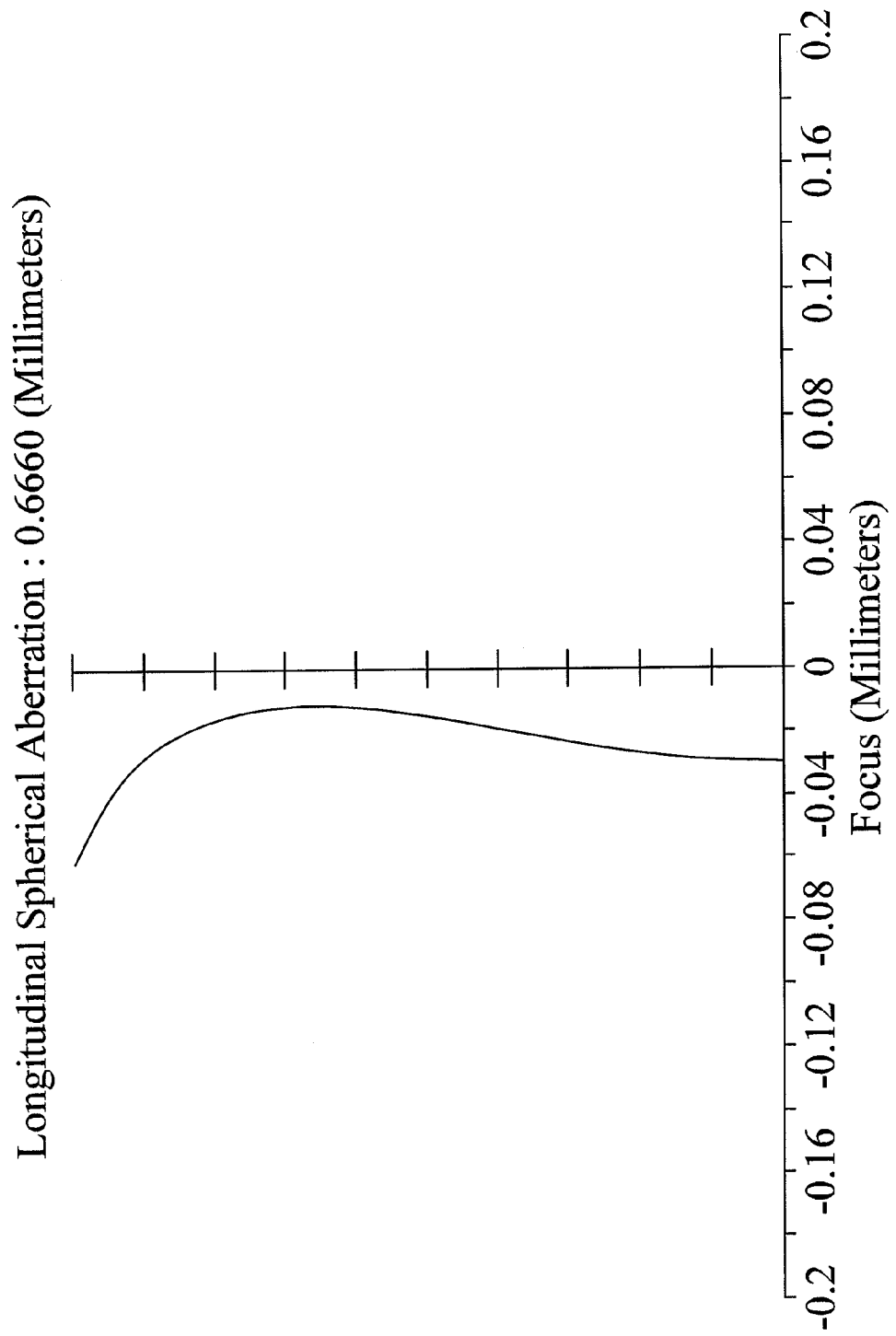
FIG. 1C is longitudinal spherical aberration curves of the first embodiment according to the present invention.

According to the optical data as shown in Table 1 and the series of aberration curves as shown in FIG. 1B and FIG. 1C, the seven-piece optical module for capturing image in accordance with this preferred embodiment of the present invention provides good correction results in aspects of the longitudinal spherical aberration, astigmatic field curving, and distortion.

Figure 2A:
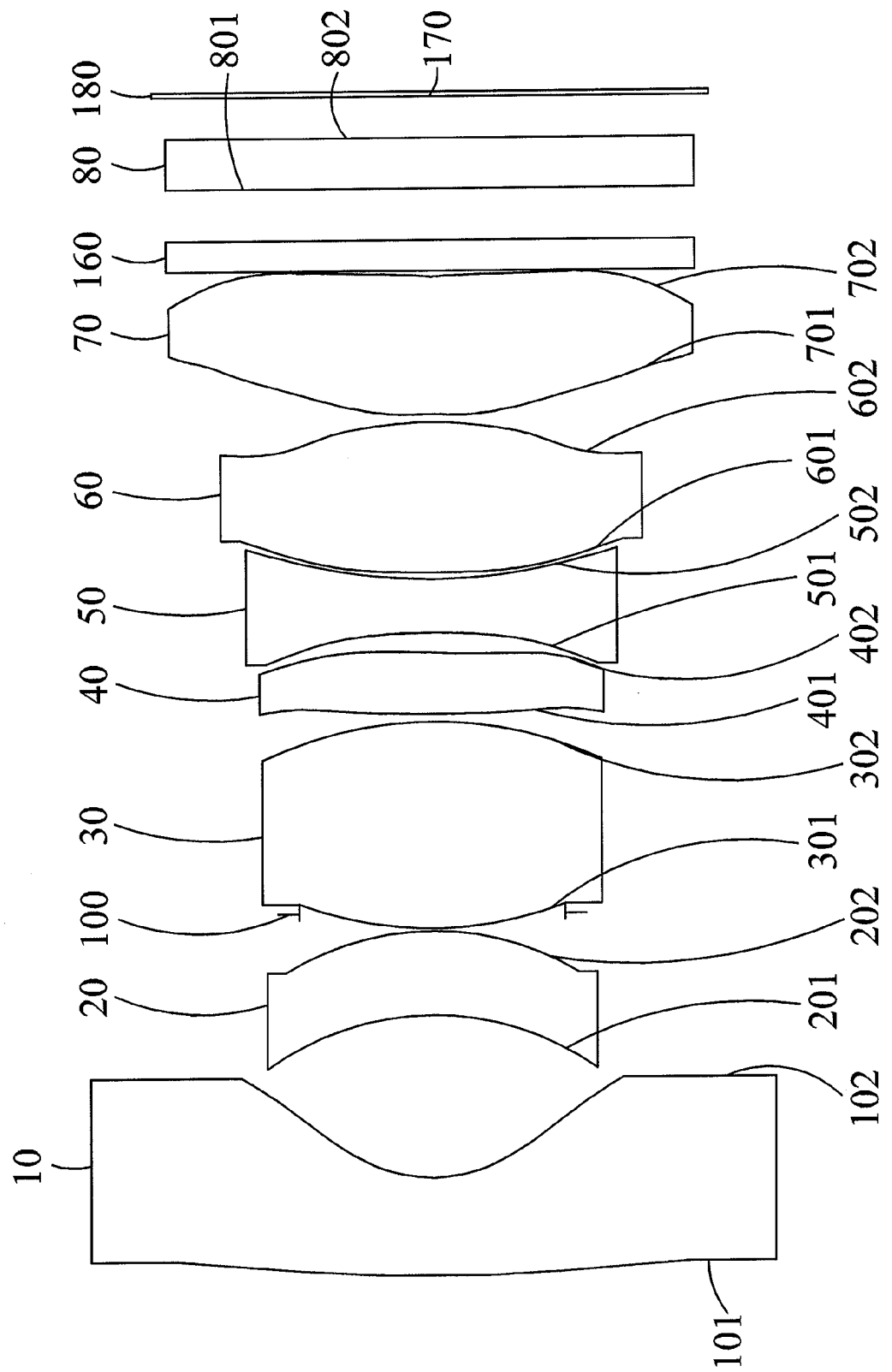
FIG. 2A is a schematic view of the second embodiment of a seven-piece optical module for capturing image according to the present invention.

Please refer to FIG. 2A which is a schematic view of the second embodiment of a seven-piece optical module for capturing image according to the present invention. As FIG. 2A shows, the present invention provides a seven-piece optical lens for capturing image, in order from an object side to an image side, the optical lens along an optical axis which comprises: a first lens element 10, a second lens element 20, a third lens element 30, a fourth lens element 40, a fifth lens element 50, a sixth lens element 60 and a seventh lens element 70. Wherein, the first lens element 10 with refractive power; the second lens element 20 with refractive power, wherein at least one of an object-side surface 201 and an image-side surface 202 of the second lens element are aspheric; the third lens element 30 with refractive power; the fourth lens element 40 with positive refractive power; the fifth lens element 50 with refractive power; the sixth lens element 60 with positive refractive power and having a convex image-side surface 602, wherein at least one of an object-side surface 601 and the image-side surface 602 of the sixth lens element are aspheric; and the seventh lens element 70 with positive refractive power and having a convex object-side surface 701, wherein at least one of an image-side surface 702 and the object-side surface 701 of the seventh lens element are aspheric.

TABLE 2

The aspheric coefficients of the first embodiment

| Surface # | 1 | 2 | 3 | 4 | 5 |
|---|---|---|---|---|---|
| k | −56.2 | −1.6 | −2.2 | 2.8 | 1.3 |
| A | −0.012 | −0.012 | 0.027 | −0.005 | −0.0045 |
| B | −0.0004 | 0.0005 | −0.0003 | 0.0089 | 0.0113 |
| C | −7.7E−06 | −9.2E−05 | −0.0004 | −0.0013 | −0.0014 |
| D | −1.4E−07 | −0.0001 | −8.4E−05 | −0.0014 | −0.0002 |
| E | 1.2E−08 | −4.8E−05 | −3.4E−05 | −0.0002 | 0.0002 |
| F | 6.3E−10 | −1.3E−05 | −1.6E−05 | 4.3E−05 | 9.6E−05 |
| G | 4.2E−11 | −3.8E−06 | −4.5E−06 | 4.2E−05 | 3.7E−05 |
| H | 3.0E−12 | −8.5E−07 | −1.7E−06 | −2.3E−05 | 4.3E−06 |

| Surface # | 6 | 7 | 8 | 9 | 10 |
|---|---|---|---|---|---|
| k | 0.02 | 0 | 0 | 0 | 0 |
| A | 0.0018 | 0 | 0 | 0 | 0 |
| B | −0.0004 | 0 | 0 | 0 | 0 |
| C | 0.001 | 0 | 0 | 0 | 0 |
| D | 3.9E−05 | 0 | 0 | 0 | 0 |
| E | −5.2E−05 | 0 | 0 | 0 | 0 |
| F | −6.3E−05 | 0 | 0 | 0 | 0 |
| G | −2.2E−05 | 0 | 0 | 0 | 0 |
| H | 5.6E−06 | 0 | 0 | 0 | 0 |

| Surface # | 11 | 12 | 13 | 14 |
|---|---|---|---|---|
| k | 1.0 | −0.7 | −7.5 | −644 |
| A | 0.0066 | −0.0059 | −0.021 | 0.066 |
| B | −0.0035 | −0.0129 | −0.0040 | −0.0069 |
| C | 0.0026 | 0.005 | −8.2E−05 | −0.002 |
| D | 0.0006 | 0.001 | −1.6E−05 | 5.8E−05 |
| E | 3.1E−05 | 5.6E−05 | 9.7E−06 | 3.0E−05 |
| F | −7.4E−05 | −2.8E−05 | 1.5E−06 | 2.6E−06 |
| G | −1.1E−05 | −8.0E−06 | 5.1E−07 | −4.0E−08 |
| H | 6.8E−06 | 1.6E−06 | −1.1E−07 | −5.5E08 |

The seven-piece optical module for capturing image of the present invention further comprises an aperture stop 100 and an IR-CUT filter 160; the aperture stop 100 is disposed between an object and the third lens element 30, the IR-CUT filter 160 is disposed between the seventh lens element 70 and a protective lens 80, and the protective lens 80 is disposed in front of an image-plane 170. The JR-CUT filter 160 is normally made of plate optical material and does not affect focal length of the seven-piece optical module for capturing image of the present invention.

The seven-piece optical module for capturing image further comprises an image sensing device 180 which is disposed on the image-plane 170 and imagines an object to be imagined. The first 10, the second 20, the third 30, the fourth 40, the fifth 50, the sixth 60 or the seventh 70 lens elements comprise plastic or glass material, and the Aspherical formula is:

$$z = ch^2/[1+[1-(k+1)c^2h^2]^{0.5}] + Ah^2 + Bh^4 + Ch^6 + Dh^8 + Eh^{10} + Fh^{12} + Gh^{14} + Hh^{16} + \ldots, \quad (1)$$

Wherein, z is a position value of the position along the optical axis and at the height h which reference to the surface apex; k is the conic coefficient, c is the reciprocal of curvature radius and A, B, C, D, E, F, G and H are high level aspheric coefficients.

The optical data of the second embodiment is shown as Table 3, wherein the object-side surfaces and the image-side surfaces of the first 10 to the seventh 70 lens elements all use the formula (1) which is consisted of the Aspherical formula, and the aspheric coefficients are shown as Table 4, wherein a focal length f of the seven-piece module for capturing image is 1.93 mm, a distance FL from the object-side surface of the first lens element to the image-side surface of the seventh lens element is 9.532 mm, Dg, which is a diagonal length of the image-plane for the max image-forming perspective view of the seven-piece optical lens for capturing image, is 5.250 mm, a central thickness of the third lens element ct3 is 1.93 mm, a curvature radius of the image-side surface of the first lens element near the optical axis R2 is 1.77 mm, FL/ct3=4.94, Dg/ct3=2.72, f/R2=1.09, FL/Dg=1.816, FL/f=4.939.

TABLE 3

The optical data of the second embodiment
The optical data of the second embodiment

| Surface# | | Curvature Radius | Thickness | Index (Nd) | Abbe# (Vd) |
|---|---|---|---|---|---|
| The first lens element | Surface #1 | 9.8 | 0.89 | 1.53 | 55.8 |
| | Surface #2 | 1.77 | 1.69 | | |
| The second lens element | Surface #3 | −1.84 | 0.79 | 1.58 | 29.9 |
| | Surface #4 | −2.57 | 0.17 | | |
| Aperture stop | | ∞ | −0.14 | | |
| The third lens element | Surface #5 | 4.98 | 1.93 | 1.8 | 40.9 |
| | Surface #6 | −3.39 | 0.05 | | |
| The fourth lens element | Surface #7 | 8.14 | 0.58 | 1.58 | 29.9 |
| | Surface #8 | −23.1 | 0.18 | | |
| The fifth lens element | Surface #9 | −4.52 | 0.5 | 1.95 | 17.4 |
| | Surface #10 | 5.38 | 0.04 | | |
| The sixth lens element | Surface #11 | 11.1 | 1.44 | 1.53 | 55.8 |
| | Surface #12 | −2.42 | 0.06 | | |
| The seventh lens element | Surface #13 | 3.55 | 1.28 | 1.53 | 55.8 |
| | Surface #14 | −11.2 | 0.03 | | |
| IR-CUT filter | Surface #15 | ∞ | 0.3 | 1.51 | 64.1 |
| | Surface #16 | ∞ | 0.48 | | |
| Protective lens | Surface #17 | ∞ | 0.5 | 1.51 | 64.1 |
| | Surface #18 | ∞ | 0.42 | | |

TABLE 4

The aspheric coefficients of the first embodiment

| Surface# | 1 | 2 | 3 | 4 | 5 |
|---|---|---|---|---|---|
| k | −25.7 | −0.0 | −0.48 | −2.2 | 0 |
| A | 0.016 | 0.096 | 0.058 | −0.013 | 0 |
| B | −0.002 | −0.003 | 0.0049 | −0.002 | 0 |
| C | −3.7E−05 | −0.001 | −0.002 | 0.002 | 0 |
| D | 2.7E−06 | −0.0004 | 0.0003 | 0.0002 | 0 |
| E | 2.7E−07 | −0.0003 | 0.0001 | −8.6E−05 | 0 |
| F | 1.0E−08 | −0.0001 | 8.2E−05 | 0.0001 | 0 |
| G | 2.6E−10 | −5.3E−05 | 2.8E−05 | 4.9E−05 | 0 |
| H | −5.8E−11 | −2.4E−05 | −1.0E−05 | 9.3E−06 | 0 |

| Surface# | 6 | 7 | 8 | 9 | 10 |
|---|---|---|---|---|---|
| k | 0 | −0.0 | 129.8 | 0 | 0 |
| A | 0 | −0.025 | −0.003 | 0 | 0 |
| B | 0 | 0.0005 | 0.006 | 0 | 0 |
| C | 0 | 0.0002 | −0.003 | 0 | 0 |
| D | 0 | −0.001 | −0.002 | 0 | 0 |
| E | 0 | −0.0003 | −3.0E−05 | 0 | 0 |
| F | 0 | −0.0001 | 6.0E−05 | 0 | 0 |
| G | 0 | −2.4E−05 | 1.5E−05 | 0 | 0 |
| H | 0 | 2.1E−05 | −1.8E−06 | 0 | 0 |

| Surface# | 11 | 12 | 13 | 14 |
|---|---|---|---|---|
| k | 31.6 | −0.5 | −7.3 | −378.5 |
| A | 0.018 | 0.052 | 0.012 | 0.07 |
| B | 0.010 | −0.002 | −0.005 | −0.014 |
| C | −0.0004 | 0.004 | 0.0007 | −4.3E−05 |
| D | −0.0003 | 0.001 | 5.4E−05 | 2.6E−05 |
| E | −1.2E−05 | 1.2E−05 | −9.1E−06 | 8.6E−06 |
| F | 2.9E−05 | −8.6E−06 | −5.0E−07 | 2.0E−07 |
| G | 5.6E−06 | −1.2E−05 | 7.2E−08 | −8.8E−08 |
| H | −4.8E−06 | 9.2E−07 | −2.3E−08 | −2.0E−08 |

Figure 2B:
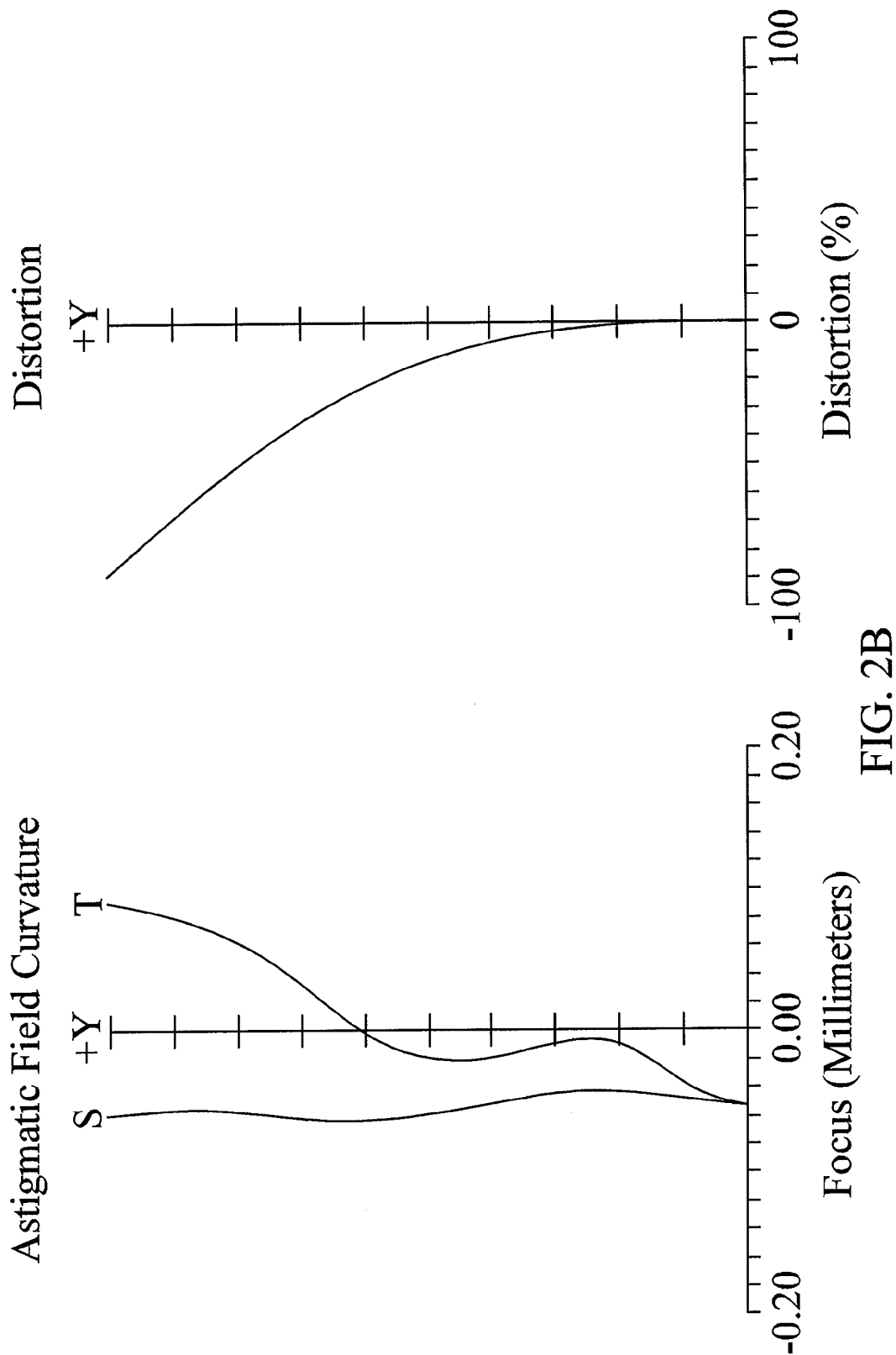
FIG. 2B is astigmatic field curves and a distortion curve of the second embodiment according to the present invention.
Figure 2C:
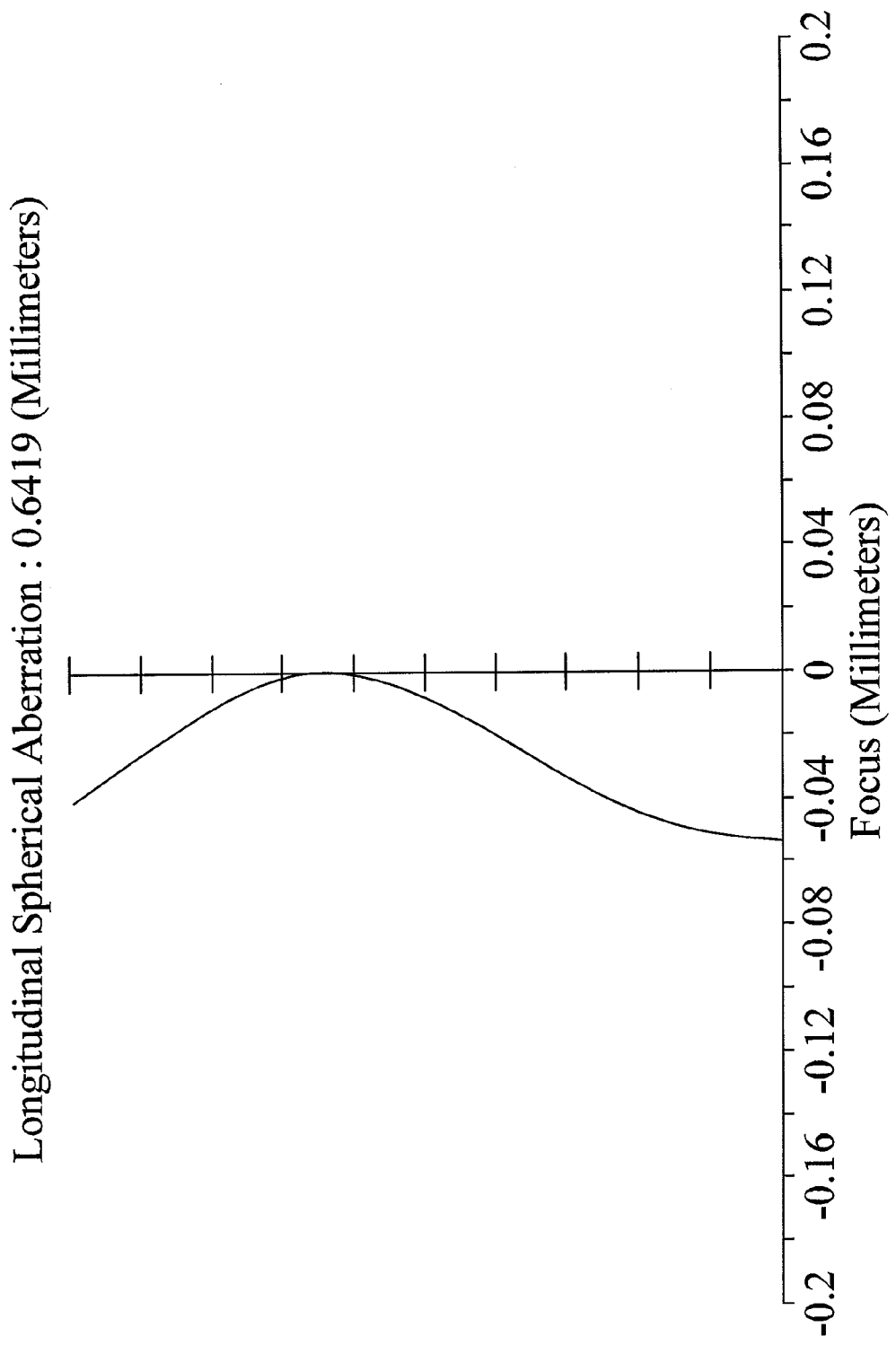
FIG. 2C is longitudinal spherical aberration curves of the second embodiment according to the present invention.

According to the optical data as shown in Table 3 and the series of aberration curves as shown in FIG. 2B and FIG. 2C, the seven-piece optical module for capturing image in accordance with this preferred embodiment of the present invention provides good correction results in aspects of the longitudinal spherical aberration, astigmatic field curving, and distortion.

Figure 3A:
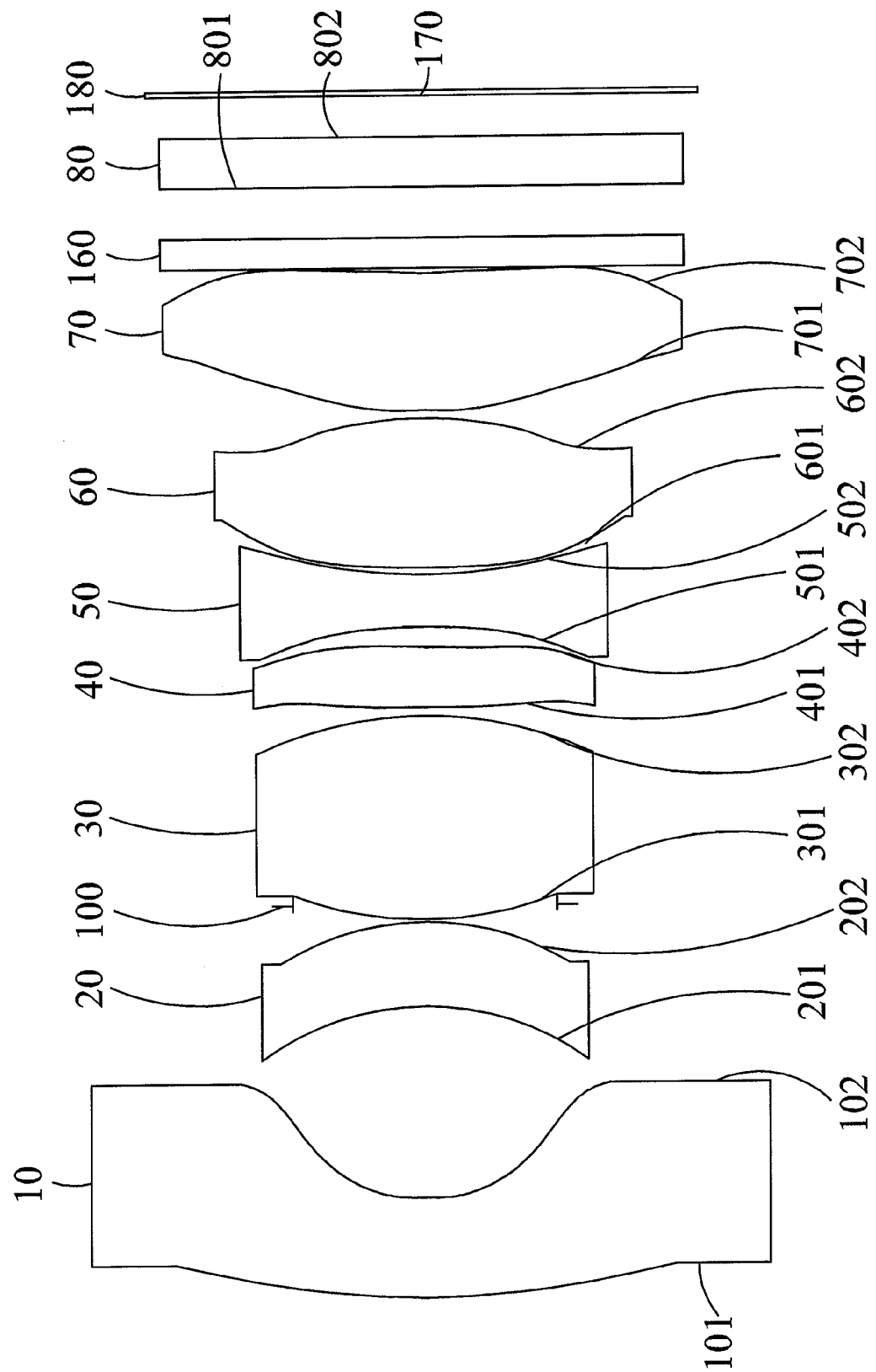
FIG. 3A is a schematic view of the third embodiment of a seven-piece optical module for capturing image according to the present invention.

Please refer to FIG. 3A which is a schematic view of the third embodiment of a seven-piece optical module for capturing image according to the present invention. As FIG. 3A shows, the present invention provides a seven-piece optical lens for capturing image, in order from an object side to an image side, the optical lens along an optical axis which comprises: a first lens element 10, a second lens element 20, a third lens element 30, a fourth lens element 40, a fifth lens element 50, a sixth lens element 60, and a seventh lens element 70. Wherein, the first lens element 10 with refractive power; the second lens element 20 with refractive power, wherein at least one of an object-side surface 201 and an image-side surface 202 of the second lens element are aspheric; the third lens element 30 with refractive power; the fourth lens element 40 with positive refractive power; the fifth lens element 50 with refractive power; the sixth lens element 60 with positive refractive power and having a convex image-side surface 602, wherein at least one of an object-side surface 601 and the image-side surface 602 of the sixth lens element are aspheric; and the seventh lens element 70 with positive refractive power and having a convex object-side surface 701, wherein at least one of the image-side surface 702 and an object-side surface 701 of the seventh lens element are aspheric.

The seven-piece optical module for capturing image of the present invention further comprises an aperture stop 100 and an IR-CUT filter 160; the aperture stop 100 is disposed between an object and the third lens element 30, the IR-CUT filter 160 is disposed between the seventh lens element 70 and a protective lens 80, and the protective lens 80 is disposed in front of an image-plane 170. The IR-CUT filter 160 is normally made of plate optical material and does not affect focal length of the seven-piece optical module for capturing image of the present invention.

The seven-piece optical module for capturing image further comprises an image sensing device 180 which is disposed on the image-plane 170 and imagines an object to be imagined. The first 10, the second 20, the third 30, the fourth 40, the fifth 50, the sixth 60 or the seventh 70 lens elements comprise plastic or glass material, and the Aspherical formula is:

$$z = ch^2/[1+[1-(k+1)c^2h^2]^{0.5}] + Ah^2 + Bh^4 + Ch^6 + Dh^8 + Eh^{10} + Fh^{12} \pm Gh^{14} + Hh^{16} + \ldots, \quad (1)$$

wherein, z is a position value of the position along the optical axis and at the height h which reference to the surface apex; k is the conic coefficient, c is the reciprocal of curvature radius and A, B, C, D, E, F, G and H are high level aspheric coefficients.

The optical data of the third embodiment is shown as Table 5, wherein the object-side surfaces and the image-side surfaces of the first 10 to the seventh 70 lens elements all use the formula (1) which is consisted of the Aspherical formula, and the aspheric coefficients are shown as Table 6, wherein a focal length f of the seven-piece module for capturing image is 1.95 mm, a distance FL from the object-side surface of the first lens element to the image-side surface of the seventh lens element is 9.829 mm, Dg, which is a diagonal length of the image-plane for the max image-forming perspective view of the seven-piece optical lens for capturing image, is 5.250 mm, a central thickness of the third lens element ct3 is 2.00 mm, a curvature radius of the image-side surface of the first lens element near the optical axis R2 is 1.82 mm, FL/ct3=4.91, Dg/ct3=2.63, f/R2=1.07, FL/Dg=1.872, FL/f=5.041.

TABLE 5

The optical data of the third embodiment
The optical data of the third embodiment

| | Surface# | Curvature Radius | Thickness | Index (Nd) | Abbe# (Vd) |
|---|---|---|---|---|---|
| The first lens element | Surface #1 | 9.8 | 0.97 | 1.53 | 55.8 |
| | Surface #2 | 1.82 | 1.71 | | |
| The second lens element | Surface #3 | −1.92 | 0.81 | 1.58 | 29.9 |
| | Surface #4 | −2.70 | 0.24 | | |

TABLE 5-continued

The optical data of the third embodiment
The optical data of the third embodiment

| | Surface# | Curvature Radius | Thickness | Index (Nd) | Abbe# (Vd) |
|---|---|---|---|---|---|
| Aperture stop | | ∞ | −0.15 | | |
| The third lens element | Surface #5 | 5.0 | 2.0 | 1.80 | 40.9 |
| | Surface #6 | −3.5 | 0.06 | | |
| The fourth lens element | Surface #7 | 8.31 | 0.59 | 1.58 | 29.9 |
| | Surface #8 | −23.4 | 0.20 | | |
| The fifth lens element | Surface #9 | −4.48 | 0.52 | 1.95 | 17.4 |
| | Surface #10 | 5.57 | 0.06 | | |
| The sixth lens element | Surface #11 | 11.46 | 1.36 | 1.53 | 55.8 |
| | Surface #12 | −2.46 | 0.05 | | |
| The seventh lens element | Surface #13 | 3.71 | 1.30 | 1.53 | 55.8 |
| | Surface #14 | −9.11 | 0.07 | | |
| IR-CUT filter | Surface #15 | ∞ | 0.3 | 1.51 | 64.1 |
| | Surface #16 | ∞ | 0.51 | | |
| Protective lens | Surface #17 | ∞ | 0.5 | 1.51 | 64.1 |
| | Surface #18 | ∞ | 0.42 | | |

TABLE 6

The aspheric coefficients of the third embodiment

| Surface# | 1 | 2 | 3 | 4 | 5 |
|---|---|---|---|---|---|
| k | −19.1 | −0.01 | −0.48 | −2.1 | 0 |
| A | 0.016 | 0.103 | 0.056 | −0.011 | 0 |
| B | −0.002 | −0.002 | 0.0045 | −0.002 | 0 |
| C | −3.8E−05 | −0.0008 | −0.001 | 0.001 | 0 |
| D | 1.9E−06 | −0.0004 | 0.0003 | 0.0002 | 0 |
| E | 2.1E−07 | −0.0002 | 0.0001 | −5.0E−05 | 0 |
| F | 7.0E−09 | −0.0001 | 6.5E−05 | 0.0001 | 0 |
| G | 4.5E−10 | −3.9E−05 | 1.9E−05 | 3.2E−05 | 0 |
| H | −4.2E−11 | −1.6E−05 | −8.5E−06 | 3.8E−06 | 0 |

| Surface# | 6 | 7 | 8 | 9 | 10 |
|---|---|---|---|---|---|
| k | 0 | 4.3 | 163 | 0 | 0 |
| A | 0 | −0.021 | −0.002 | 0 | 0 |
| B | 0 | 0.0026 | 0.008 | 0 | 0 |
| C | 0 | −2.7E−05 | −0.003 | 0 | 0 |
| D | 0 | −0.002 | −0.002 | 0 | 0 |
| E | 0 | −2.4E−05 | 2.1E−05 | 0 | 0 |
| F | 0 | 0.0001 | 6.8E−05 | 0 | 0 |
| G | 0 | 2.1E−06 | 1.0E−05 | 0 | 0 |
| H | 0 | −1.2E−05 | −4.6E−06 | 0 | 0 |

| Surface# | 11 | 12 | 13 | 14 |
|---|---|---|---|---|
| k | 22.4 | −0.59 | −7.2 | −119.8 |
| A | 0.016 | 0.044 | 0.011 | 0.072 |
| B | 0.011 | −0.0011 | −0.004 | −0.012 |
| C | −0.0005 | 0.003 | 0.0007 | 1.0E−06 |
| D | 3.4E−05 | 0.001 | 4.2E−05 | 6.0E−06 |
| E | −3.6E−05 | 3.7E−05 | −1.0E−05 | 5.7E−06 |
| F | 8.5E−06 | −1.3E−06 | −6.5E−07 | 2.4E−07 |
| G | 4.3E−06 | −8.8E−06 | 2.6E−07 | −8.3E−08 |
| H | −1.3E−06 | 4.3E−07 | −3.1E−08 | −8.9E−09 |

Figure 3B:
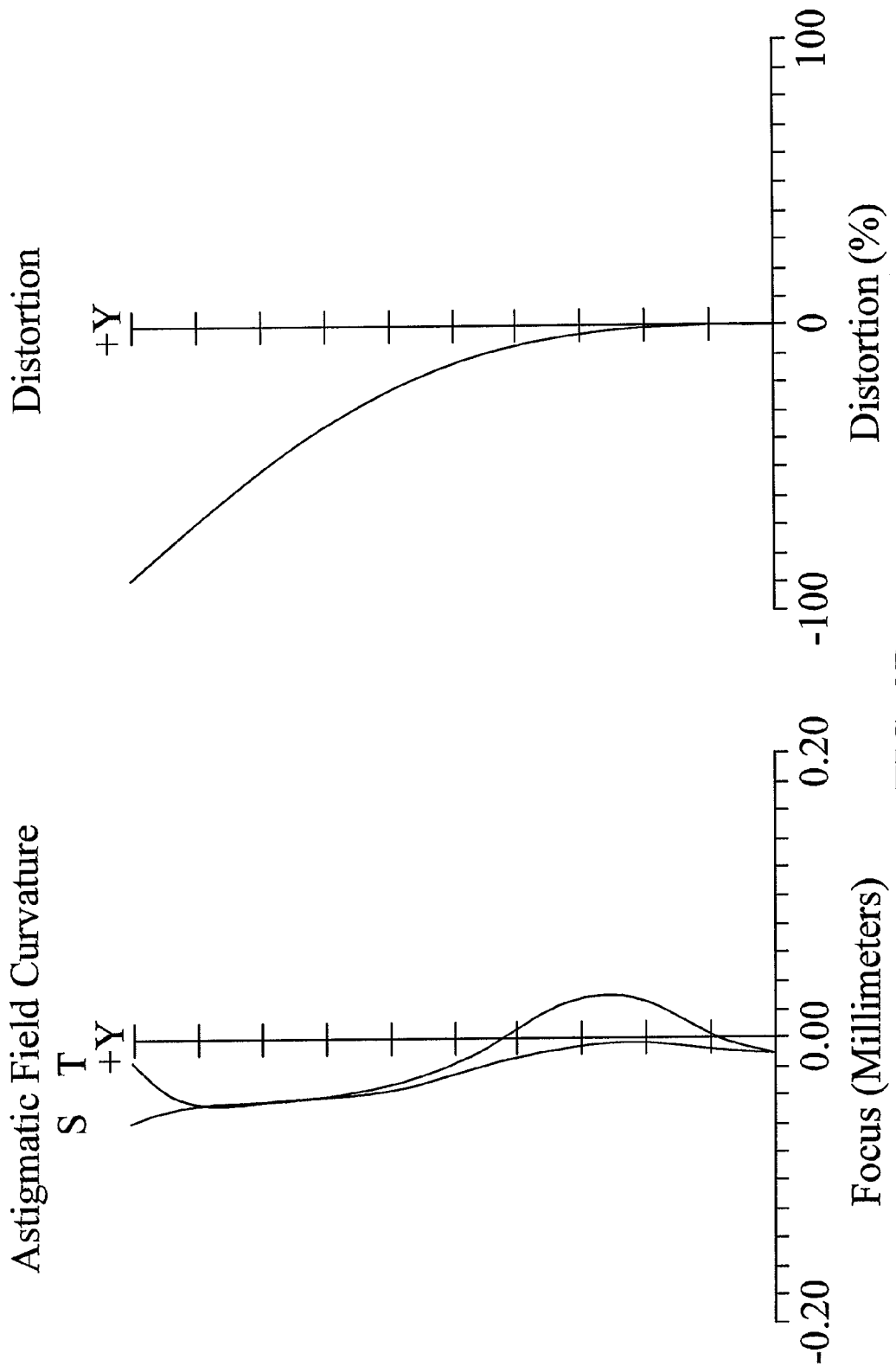
FIG. 3B is astigmatic field curves and a distortion curve of the third embodiment according to the present invention.
Figure 3C:
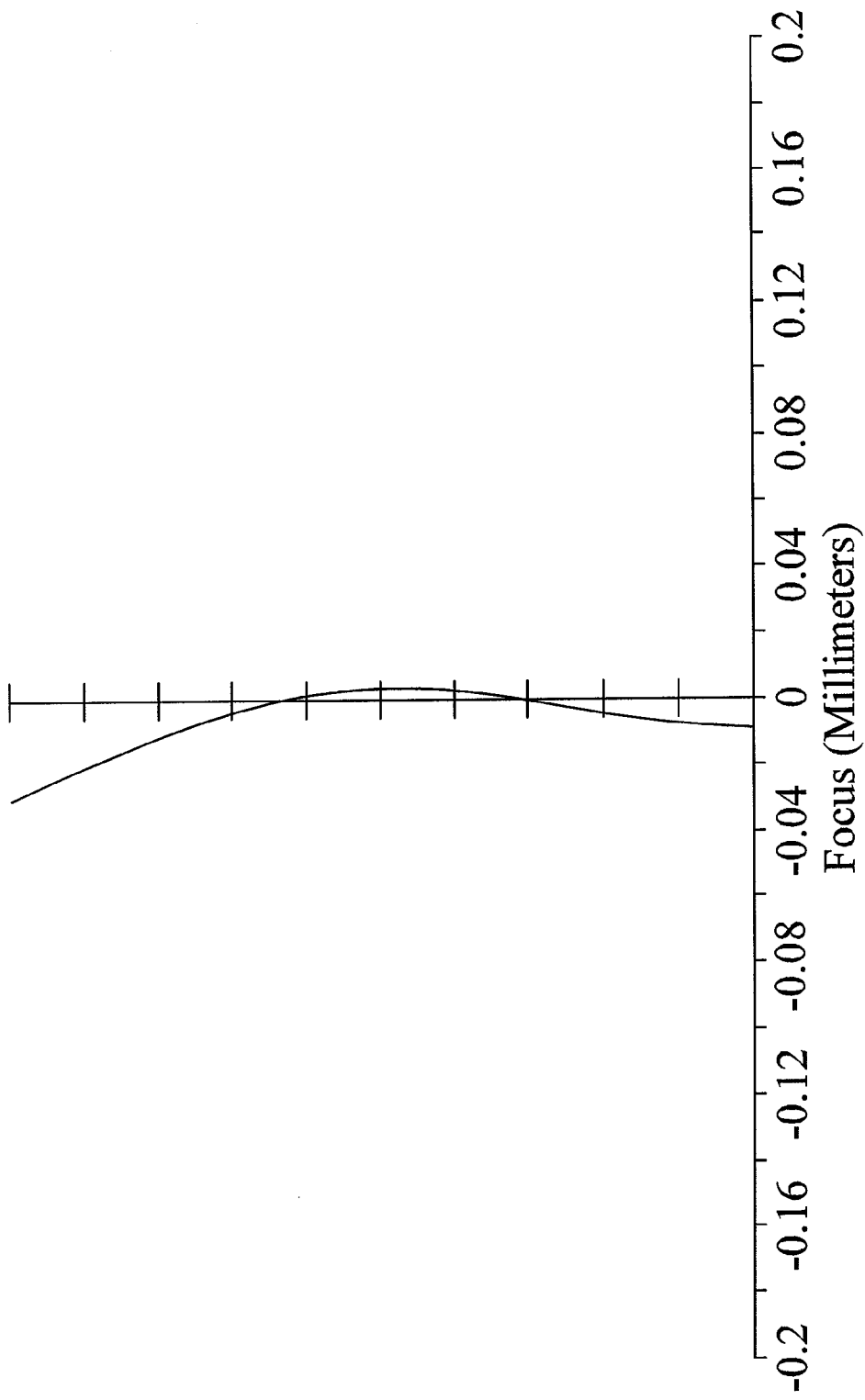
FIG. 3C is longitudinal spherical aberration curves of the third embodiment according to the present invention.

According to the optical data as shown in Table 5 and the series of aberration curves as shown in FIG. 3B and FIG. 3C, the seven-piece optical module for capturing image in accordance with this preferred embodiment of the present invention provides good correction ° results in aspects of the longitudinal spherical aberration, astigmatic field curving, and distortion.

Figure 4A:
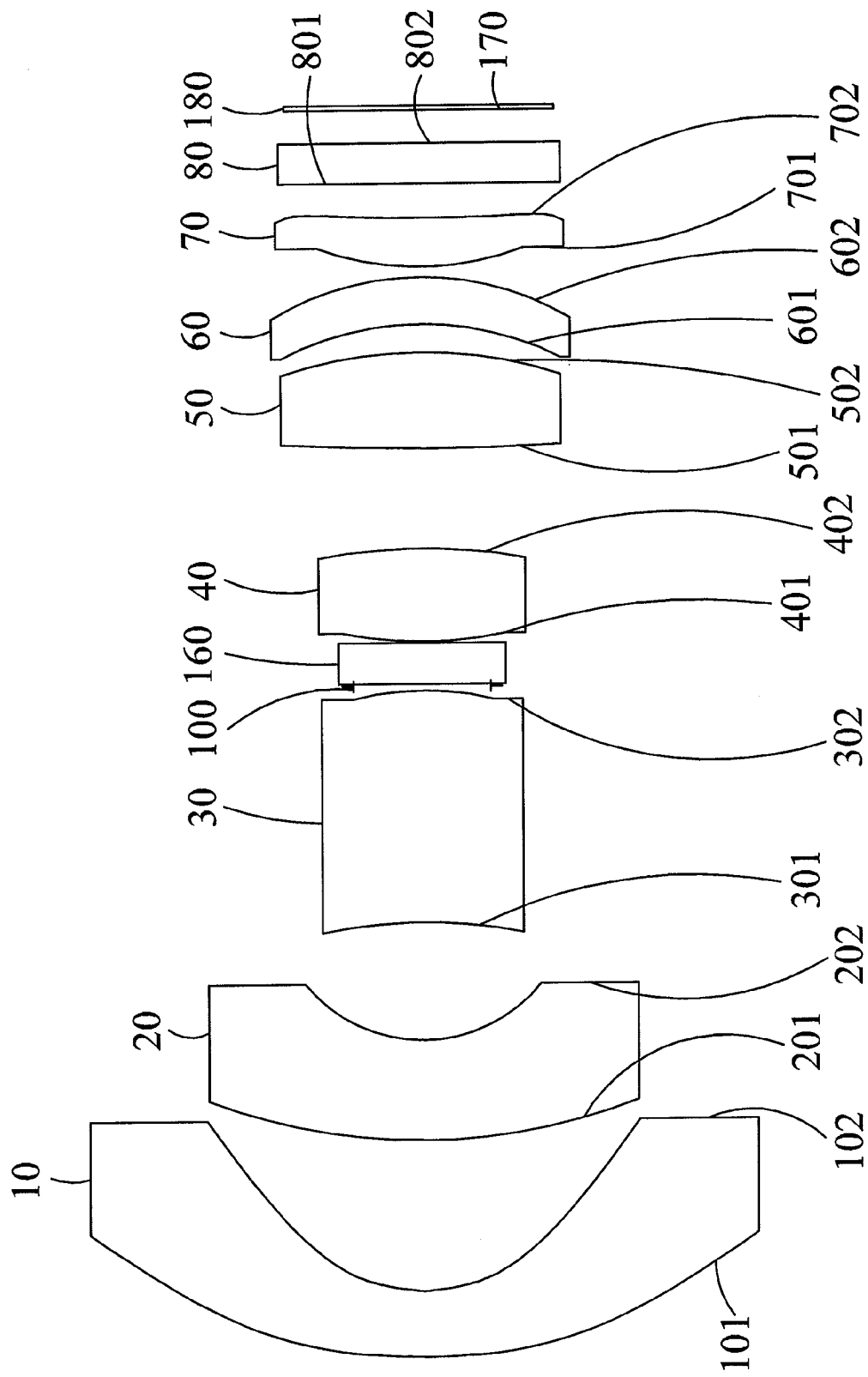
FIG. 4A is a schematic view of the fourth embodiment of a seven-piece optical module for capturing image according to the present invention.

Please refer to FIG. 4A which is a schematic diagram of the fourth embodiment of a seven-piece optical module for capturing image according to the present invention. As FIG. 4A shows, the present invention provides a seven-piece optical lens for capturing image, in order from an object side to an image side, the optical lens along an optical axis which comprises: a first lens element 10, a second lens element 20, a third lens element 30, a fourth lens element 40, a fifth lens element 50, a sixth lens element 60, and a seventh lens element 70. Wherein, the first lens element 10 with refractive power; the second lens element 20 with refractive power, wherein at least one of an object-side surface 201 and an image-side surface 202 of the second lens element are aspheric; the third lens element 30 with refractive power; the fourth lens element 40 with positive refractive power; the fifth lens element 50 with refractive power; the sixth lens element 60 with positive refractive power and having a convex image-side surface 602, wherein at least one of an object-side surface 601 and the image-side surface 602 of the sixth lens element are aspheric; and the seventh lens element 70 with positive refractive power and having a convex object-side surface 701, wherein at least one of an image-side surface 702 and the object-side surface 701 of the seventh lens element are aspheric.

The seven-piece optical module for capturing image of the present invention further comprises an aperture stop 100 and an IR-CUT filter 160; the aperture stop 100 is disposed between an object and the fourth lens element 40, the IR-CUT filter 160 is disposed between the third lens element 30 and the fourth lens element 40, and the protective lens 80 is disposed in front of an image-plane 170. The IR-CUT filter 160 is normally made of plate optical material and does not affect focal length of the seven-piece optical module for capturing image of the present invention.

The seven-piece optical module for capturing image further comprises an image sensing device 180 which is disposed on the image-plane 170 and imagines an object to be imagined. The first 10, the second 20, the third 30, the fourth 40, the fifth 50, the sixth 60, or the seventh 70 lens elements comprise plastic or glass material, and the Aspherical formula is:

$$z=ch^2/[1+[1-(k+1)c^2h^2]^{0.5}]+Ah^2+Bh^4+Ch^6+Dh^8+Eh^{10}+Fh^{12}+Gh^{14}+Hh^{16}+\ldots, \quad (1)$$

wherein, z is a position value of the position along the optical axis and at the height h which reference to the surface apex; k is the conic coefficient, c is the reciprocal of curvature radius and A, B, C, D, E, F, G and H are high level aspheric coefficients.

The optical data of the third embodiment is shown as Table 7, wherein the object-side surfaces and the image-side surfaces of the first 10 to the seventh 70 lens elements all use the formula (1) which is consisted of the Aspherical formula, and the aspheric coefficients are shown as Table 8, wherein a focal length f of the seven-piece module for capturing image is 0.429 mm, a distance FL from the object-side surface of the first lens element to the image-side surface of the seventh lens element is 5.631 mm, Dg, which is a diagonal length of the image-plane for the max image-forming perspective view of the seven-piece optical lens for capturing image, is 1.103 mm, a central thickness of the third lens element ct3 is 0.81 mm, a curvature radius of the image-side surface of the first lens element near the optical axis R2 is 0.65 mm, FL/ct3=4.89, Dg/ct3=0.96, f/R2=0.66, FL/Dg=5.105, FL/f=13.126.

TABLE 7

The optical data of the fourth embodiment
The optical data of the fourth embodiment

| | Surface# | Curvature Radius | Thickness | Index (Nd) | Abbe# (Vd) |
|---|---|---|---|---|---|
| The first lens element | Surface #1 | 2.32 | 0.32 | 1.53 | 55.8 |
| | Surface #2 | 0.65 | 0.74 | | |
| The second lens element | Surface #3 | 2.07 | 0.49 | 1.53 | 55.8 |
| | Surface #4 | 0.86 | 0.58 | | |
| The third lens element | Surface #5 | −2.67 | 1.15 | 1.74 | 49.2 |
| | Surface #6 | −1.53 | 0.01 | | |
| Aperture stop | | ∞ | 0.01 | | |
| IR-CUT filter | Surface #7 | ∞ | 0.2 | 1.51 | 64.1 |
| | Surface #8 | ∞ | 0.014 | | |
| The fourth lens element | Surface #9 | 2.28 | 0.45 | 1.53 | 55.8 |
| | Surface #10 | −2.7 | 0.5 | | |
| The fifth lens element | Surface #11 | 8.10 | 0.47 | 1.53 | 55.8 |
| | Surface #12 | −2.77 | 0.13 | | |
| The sixth lens element | Surface #13 | −1.63 | 0.24 | 1.53 | 55.8 |
| | Surface #14 | −1.59 | 0.04 | | |
| The seventh lens element | Surface #15 | 1.04 | 0.24 | 1.61 | 25.5 |
| | Surface #16 | 4.56 | 0.16 | | |
| Protective lens | Surface #17 | ∞ | 0.21 | 1.51 | 64.1 |
| | Surface #18 | ∞ | 0.17 | | |

TABLE 8

The aspheric coefficients of the fourth embodiment

| Surface# | 1 | 2 | 3 | 4 | 5 | 6 |
|---|---|---|---|---|---|---|
| k | −0.57 | −0.96 | −10.0 | 0.15 | 0 | 0 |
| A | 0 | 0 | 0 | 0 | 0 | 0 |
| B | 0.012 | 0.005 | 0.008 | 0.216 | 0 | 0 |
| C | −0.006 | 0.013 | 0.018 | 0.530 | 0 | 0 |
| D | 0.0003 | −0.074 | −0.071 | 0.200 | 0 | 0 |
| E | 0.0001 | −0.002 | 0.047 | −0.402 | 0 | 0 |
| F | 5.8E−05 | 0.0088 | 0.0035 | −0.404 | 0 | 0 |
| G | 2.4E−05 | 0.007 | −0.005 | −0.326 | 0 | 0 |
| H | −2.1E−05 | 0.004 | 0.002 | −2.605 | 0 | 0 |

| Surface# | 9 | 10 | 11 | 12 | 13 | 14 |
|---|---|---|---|---|---|---|
| k | −6.2 | 3.38 | 36.4 | 0.34 | 0.04 | 0.83 |
| A | 0 | 0 | 0 | 0 | 0 | 0 |
| B | −0.012 | −0.023 | −0.015 | −0.073 | −0.005 | −0.041 |
| C | −0.019 | −0.023 | −0.15 | −0.06 | −0.013 | −0.084 |
| D | −0.014 | −0.001 | −0.144 | −0.093 | −0.088 | 0.045 |
| E | −0.012 | −0.009 | −0.08 | −0.084 | 0.087 | 0.053 |
| F | −0.044 | −0.039 | −0.099 | 0.050 | 0 | 0 |
| G | −0.082 | 0.029 | −0.044 | 0.110 | 0 | 0 |
| H | 0.267 | 0.120 | 0.361 | −0.04 | 0 | 0 |

| Surface# | 15 | 16 |
|---|---|---|
| k | −2.8 | 2.39 |
| A | 0 | 0 |
| B | −0.186 | −0.232 |
| C | −0.300 | 0.098 |
| D | −0.765 | 0.592 |
| E | 0.580 | −5.435 |
| F | 0.437 | 12.38 |
| G | −0.957 | −14.83 |
| H | 1.186 | 7.584 |

Figure 4B:
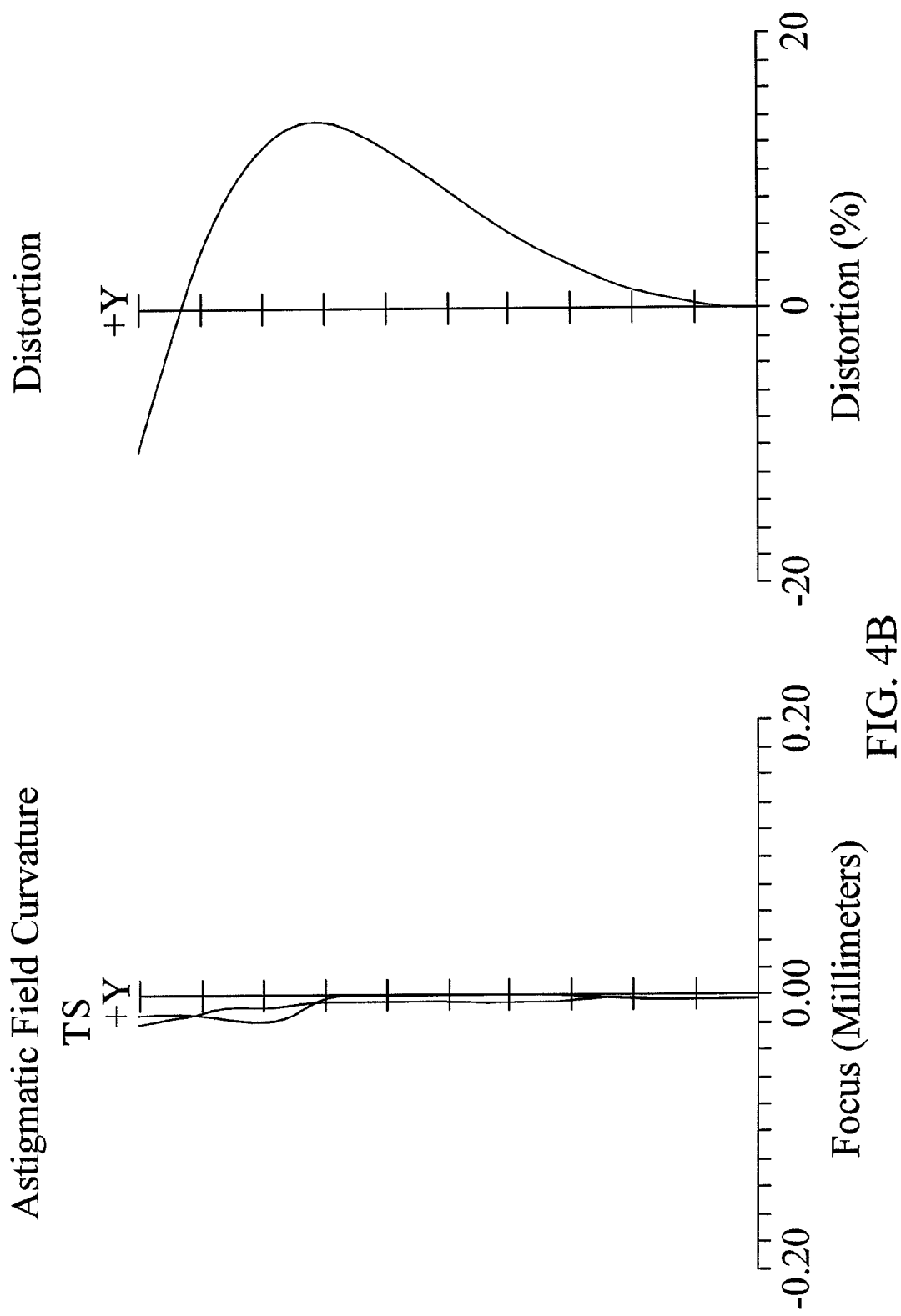
FIG. 4B is astigmatic field curves and a distortion curve of the fourth embodiment according to the present invention.
Figure 4C:
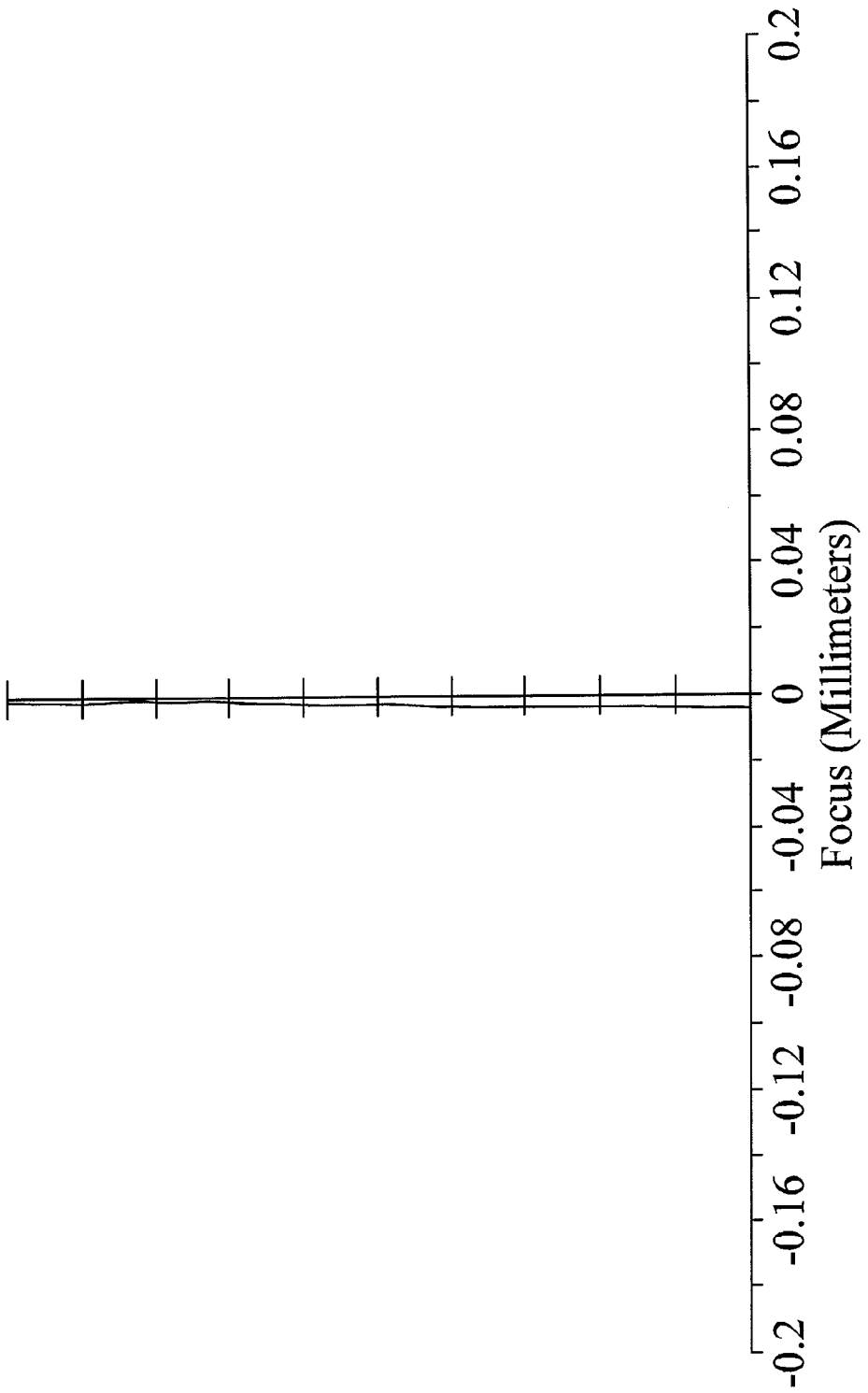
FIG. 4C is longitudinal spherical aberration curves of the fourth embodiment according to the present invention.

According to the optical data as shown in Table 7 and the series of aberration curves as shown in FIG. 4B and FIG. 4C, the seven-piece optical module for capturing image in accordance with this preferred embodiment of the present invention provides good correction results in aspects of the longitudinal spherical aberration, astigmatic field curving, and distortion.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A seven-piece optical lens for capturing image, in order from an object side to an image side, the optical lens along an optical axis comprising:
    a first lens element with refractive power near the optical axis;
    a second lens element with refractive power near the optical axis, wherein at least one of an object-side surface and an image-side surface of the second lens element are aspheric;
    a third lens element with refractive power near the optical axis;
    a fourth lens element with positive refractive power near the optical axis;
    a fifth lens element with refractive power near the optical axis;
    a sixth lens element with positive refractive power near the optical axis and having a convex image-side surface, wherein at least one of an object-side surface and the image-side surface of the sixth lens element are aspheric; and
    a seventh lens element with positive refractive power near the optical axis and having a convex object-side surface, wherein at least one of an image-side surface and the object-side surface of the seventh lens element are aspheric, wherein f is a focal length of the seven-piece optical lens for capturing image, FL is a distance from an object-side surface of the first lens element to the image-side surface of the seventh lens element along the optical axis, and the following relation is satisfied:

$1.0 < FL/f < 8.0$.

2. The seven-piece optical lens for capturing image of claim 1, wherein FL is a distance from an object-side surface of the first lens element to the image-side surface of the seventh lens element along the optical axis, ct3 is a central thickness of the third lens element, and the following relation is satisfied:

$3.0 < FL/ct3 < 13.0$.

3. The seven-piece optical lens for capturing image of claim 1, wherein Dg is a diagonal length of an image-plane for the max image-forming perspective view of the seven-piece optical lens for capturing image, ct3 is a central thickness of the third lens element, and the following relation is satisfied:

$0.8 < Dg/ct3 < 8.0$.

4. The seven-piece optical lens for capturing image of claim 1, wherein f is a focal length of the seven-piece optical lens for capturing image, R2 is a curvature radius of the image-side surface of the first lens element near the optical axis, and the following relation is satisfied:

$0.4 < f/R2 < 2.5$.

5. The seven-piece optical lens for capturing image of claim 1, wherein the first, the second, the third, the fourth, the fifth, the sixth or the seventh lens elements comprise a plastic material.

6. A seven-piece optical module for capturing image, comprising:
    a seven-piece optical lens for capturing image, in order from an object side to an image side, the optical lens along an optical axis comprising:
    a first lens element with refractive power near the optical axis;
    a second lens element with refractive power near the optical axis, wherein at least one of an object-side surface and an image-side surface of the second lens element are aspheric;
    a third lens element with refractive power near the optical axis;
    a fourth lens element with positive refractive power near the optical axis;
    a fifth lens element with refractive power near the optical axis;
    a sixth lens element with positive refractive power near the optical axis and having a convex image-side surface, wherein at least one of an object-side surface and the image-side surface of the sixth lens element are aspheric; and
    a seventh lens element with positive refractive power near the optical axis and having a convex object-side surface, wherein at least one of an image-side surface and the object-side surface of the seventh lens element are aspheric;
    an image sensing device, disposed on an image-plane for image formation for an object; and
    an aperture stop disposed between the object and the fourth lens element, wherein f is a focal length of the seven-piece optical lens for capturing image, FL is a distance from an object-side surface of the first lens element to the image-side surface of the seventh lens element along the optical axis, and the following relation is satisfied:

$1.0 < FL/f < 8.0$.

7. The seven-piece optical module for capturing image of claim 6, wherein Dg is a diagonal length of the image-plane for a max image-forming perspective view of the lens of the seven-piece optical lens for capturing image, FL is a distance from the object-side surface of the first lens element to the image-side surface of the seventh lens element along the optical axis, and the following relation is satisfied:

$3.0 < FL/Dg < 20.0$.

8. The seven-piece optical module for capturing image of claim 6, further comprising an IR-CUT filter adjusting passing wavelength section of light of the image.

9. The seven-piece optical module for capturing image of claim 8, wherein the IR-CUT filter comprises a plate glass material.

10. The seven-piece optical module for capturing image of claim 8, wherein the seven-piece optical module for capturing image imagines the object on the image sensing device by combination of the first, the second, the third, the fourth, the fifth, the sixth and the seventh lens elements, the aperture stop, the IR-CUT filter and a protective lens.

11. The seven-piece optical module for capturing image of claim 6, wherein the first, the second, the third, the fourth, the fifth, the sixth, or the seventh lens elements comprise a plastic material.

* * * * *